(12) United States Patent
Plais et al.

(10) Patent No.: US 10,843,158 B2
(45) Date of Patent: Nov. 24, 2020

(54) FILTERING AND DISTRIBUTION DEVICE FOR CATALYTIC REACTOR

(71) Applicant: IFP Energies Nouvelles, Rueil-Malmaison (FR)

(72) Inventors: Cecile Plais, Les Haies (FR); Frederic Bazer-Bachi, Irigny (FR); Yacine Haroun, Lyons (FR); Jauffray Salvatore Delteil, Moisselles (FR); Wilfried Weiss, Valencin (FR); Younes Aiddouch, Senlis (FR); Jerome Bonnardot, Fontenay le Fleury (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 335 days.

(21) Appl. No.: 15/774,714

(22) PCT Filed: Oct. 14, 2016

(86) PCT No.: PCT/EP2016/074820
§ 371 (c)(1),
(2) Date: May 9, 2018

(87) PCT Pub. No.: WO2017/080756
PCT Pub. Date: May 18, 2017

(65) Prior Publication Data
US 2020/0261875 A1    Aug. 20, 2020

(30) Foreign Application Priority Data
Nov. 9, 2015 (FR) .................................... 15 60714
May 18, 2016 (FR) .................................... 16 54396

(51) Int. Cl.
*B01J 8/00* (2006.01)
*B01J 8/02* (2006.01)
(Continued)

(52) U.S. Cl.
CPC .......... *B01J 8/0278* (2013.01); *B01D 24/002* (2013.01); *B01D 24/22* (2013.01); *B01J 2208/00938* (2013.01)

(58) Field of Classification Search
CPC ...... B01D 24/00; B01D 24/002; B01D 24/02; B01D 24/20; B01D 24/22; B01J 8/00;
(Continued)

(56) References Cited

U.S. PATENT DOCUMENTS 7,500,658 B2  3/2009  Boyer et al.
8,329,974 B2  12/2012  Koudil et al.
(Continued)

FOREIGN PATENT DOCUMENTS

FR    2889973 A1    3/2007
FR    2959677 A1    11/2011
(Continued)

OTHER PUBLICATIONS

International Search Report dated Jan. 13, 2017 issued in corresponding PCT/EP2016/074820 application (3 pages).

*Primary Examiner* — Natasha E Young
(74) *Attorney, Agent, or Firm* — Millen, White, Zelano & Branigan, PC; Ryan Pool (57) ABSTRACT

The present invention concerns a device for filtration and distribution of a gaseous phase and a liquid phase, which can be disposed upstream of a fixed catalytic bed of a reactor operating with a descending co-current of gas and liquid, comprising:
 a solid plate on which substantially vertical risers are fixed, said risers are open at their upper and lower ends and have openings over at least a fraction of their height;
 a plurality of removable baskets capable of retaining at least one filtration medium, each removable basket
(Continued)

being defined by an ellipsoidal vertical wall or by at least three vertical lateral walls and a bottom, the vertical walls and/or the bottom being permeable to a gas and to liquid.

Each basket is provided support means cooperating with a riser of the plate in order to support the basket.

18 Claims, 4 Drawing Sheets

(51) Int. Cl.
  *B01D 24/00* (2006.01)
  *B01D 24/22* (2006.01)
(58) Field of Classification Search
  CPC ........ B01J 8/02; B01J 8/0278; B01J 2208/00; B01J 2208/00796; B01J 2208/00938
  See application file for complete search history.

(56) References Cited

U.S. PATENT DOCUMENTS

| | | | |
|---|---|---|---|
| 8,728,403 | B2 | 5/2014 | Koudil et al. |
| 9,480,957 | B2 | 11/2016 | Bazer-Bachi et al. |
| 2007/0144352 | A1 | 6/2007 | Boyer et al. |
| 2009/0177023 | A1 | 7/2009 | Koudil et al. |
| 2011/0275870 | A1 | 11/2011 | Koudil et al. |
| 2013/0064727 | A1 | 3/2013 | Koudil et al. |
| 2014/0097125 | A1 | 4/2014 | Bazer-Bachi et al. |
| 2016/0107099 | A1 | 4/2016 | Haroun et al. |

FOREIGN PATENT DOCUMENTS

| | | | | |
|---|---|---|---|---|
| FR | 2996465 | A1 | 4/2014 | |
| FR | 3006599 | A1 * | 12/2014 | ............ B01D 3/008 |
| WO | 2006/097590 | A2 | 9/2006 | |

* cited by examiner

FILTERING AND DISTRIBUTION DEVICE FOR CATALYTIC REACTOR

The present invention relates to the field of distributor plates for supplying gas and liquid to chemical reactors operating in a descending co-current of gas and liquid mode.

Reactors of this type are encountered in the refining field, in particular in hydrotreatments which require streams of hydrogen under high pressure and operating with heavy liquid feeds which may contain impurities constituted by solid fouling particles.

In some cases, the liquid feed, or even the mixture of the liquid feed and a hydrogen-rich gas contain impurities which under the temperature and pressure conditions necessary for hydrotreatment could become deposited on the catalytic bed itself and, over time, reduce the interstitial volume of that catalytic bed and thus result in a gradual increase in the pressure drop. In extreme cases, in particular at the end of a cycle, clogging of the catalytic bed is observed, which leads to a very rapid rise in the pressure drop, which thus perturbs the flow through the reactor.

The pressure drop may become such that the operator has to shut down the reactor and replace part or all of the catalyst, which obviously results in a considerable reduction in the contact times of the process.

Fouling feeds which may be cited include mixtures of hydrocarbons which may contain a non-negligible proportion of unsaturated or polyunsaturated acetylenic or dienic compounds, or a combination of these different compounds, the total proportion of unsaturated compounds possibly being up to 90% by weight in the feed. Pyrolysis gasoline may be cited by way of a representative example of the feeds concerned in the present invention; pyrolysis designates a thermal cracking process which is well known to the person skilled in the art. Heavy hydrocarbon cuts may also be cited, in particular gas oils, vacuum gas oils, atmospheric residues or vacuum residues. These heavy cuts may be obtained from straight run distillation of crude oil or from conversion processes such as visbreaking, cokefaction, deasphalting, catalytic cracking or hydrocracking.

Clogging of a portion of the catalytic bed may be due to several mechanisms.

Directly, the presence of particles in the stream of feed may cause clogging by depositing said particles in the catalytic bed, this deposition having the result of reducing the void fraction.

Indirectly, the formation of a layer of products obtained from the chemical reactions, typically coke, but possibly other solid products derived from the impurities present in the feed, are deposited on the surface of the grains of catalyst; this may also contribute to a reduction of the void fraction of the bed.

The heavy hydrocarbon cuts mentioned above may also contain a variety of impurities, in particular iron or calcium derivatives, which may contribute to clogging of the catalytic beds. Residue type cuts also contain asphaltenes, which are chemical compounds which are often described as being coke precursors. In addition, the deposition of clogging particles may occur in the bed in a more or less random manner, and so heterogeneities may occur in the distribution of the void fraction of that bed, which will result in the generation of preferential pathways.

These preferential pathways are extremely prejudicial from a hydrodynamic point of view because they perturb the homogeneity of the flow of the phases in the bed to a greater or lesser degree of severity and may result in heterogeneities as regards the progress of the chemical reaction, as well as from a thermal viewpoint (difference in radial temperature, hot spots, for example).

PRIOR ART

In order to prevent premature clogging of the catalytic bed, various technical solutions have been developed which are based on using a filtration system disposed upstream of the catalytic bed (in the direction of flow of fluids).

Examples which may be cited are:

the document FR 2 889 973, which discloses a distributor plate which directly supports a filtration medium which can thus carry out both the functions of filtration as regards a catalytic bed placed downstream, and distribution of gaseous and liquid fluids. The filtration plate of FR 2 889 973 comprises risers with perforated holes (or slots) in the middle of the filtration bed, which could give rise to difficulties in the case of plugging of the bed close to the holes. This clogging of the bed could as a consequence cause clogging of the riser, with two consequences: an imbalance in the distribution of the liquid flow below the distributor plate, and a risk of damaging the risers when the plate with the risers which have been stuck to and aggregated with the filtration bed is dismantled.

the document FR 2 959 677, which describes an assembly of removable baskets containing filtration particles, these baskets being deposited on the distributor plate in order to facilitate assembly/dismantling of the filtration device without interfering with the distributor plate. In order to ensure mechanical integrity of the system of baskets, said removable baskets are held in position by means of bolts or by a clamping system, which complicates assembly and dismantling operations.

the document FR 2 996 465 discloses a filtration and distribution assembly for a gas and liquid phase, comprising a distributor plate provided with distribution risers and an upper perforated filtration support on which a bed of filtration medium is disposed which is traversed by the risers of the distributor plate. The filtration support is mechanically held on the distributor plate by means of a welded part placed between said support and the plate, or by a system of screws. The principal difficulty with using that system resides in filling with the filtration medium, which has to be carried out once the support has been placed in the reactor, and in particular during dismantling of the system which requires firstly emptying out the support from inside the reactor, which is made even more difficult in the case of agglomeration (or solidification) of the filtration medium.

One aim of the invention is to provide a novel filtration and distribution device for a reactor with a descending co-current flow of a gaseous phase and a liquid phase which is easier to install and dismantle, thereby allowing the downtime of the reactor to be reduced and to limit the risks of degradation of said device during dismantling operations.

SUMMARY OF THE INVENTION

To this end, a device for filtration and distribution of a gaseous phase and a liquid phase is proposed, which can be disposed upstream of a fixed catalytic bed of a reactor operating with a descending co-current of gas and liquid, comprising:

a solid plate extending in a horizontal plane on which substantially vertical risers which are open at their upper and lower ends are fixed, said risers being provided with openings over at least a fraction of their height;

a plurality of removable baskets which are capable of containing and retaining at least one filtration medium, each removable basket being defined by an ellipsoidal vertical wall or by at least three vertical lateral walls and a bottom, the vertical walls and/or the bottom being permeable to gas and to liquid and in which each basket is provided with at least one basket support means cooperating with a riser of the plate in order to support the removable basket.

Compared with prior art devices, the operations for assembly and dismantling are facilitated, given that in the device in accordance with the invention, the removable baskets are directly supported by the risers; thus, it is not necessary to employ supplemental means for fixing the baskets to the distributor plate such as, for example, screws or clamps.

In addition to their support function for the removable baskets, the risers of the distributor plate can act as guides during installation of said baskets.

Another advantage of the device in accordance with the invention arises from the fact that loading the baskets with filtration medium may be carried out outside the reactor, which facilitates and greatly accelerates the operation, this then being limited to positioning the loaded baskets above the distributor plate. In addition, the height of the filtration particles in each basket may be adjusted very precisely basket by basket.

In accordance with one embodiment, at least one riser passes through the bottom of the basket and the support means cooperate with the riser passing through the bottom.

In accordance with another embodiment, at least one of the lateral walls of the basket comprises the support means cooperating with a riser.

Preferably, the support means comprises a tube fixed on the bottom of the basket the diameter of which is substantially greater than that of the riser, said tube being closed at an upper end and open at a lower end in a manner such that the tube is capable of receiving the riser and thus of resting thereon.

The tube may thus comprise one or more openings in a section adjoining its upper end so as to allow the gaseous phase to diffuse into the interior of the risers. In one embodiment, the tube is permeable to the liquid phase and optionally capable of retaining the solid phase constituted by the filtration medium. The tube is also porous over its height so as to allow the liquid phase accumulated in the filtration medium to pass into the risers. As an example, the openings are distributed over the height of the tube with a regular pitch between the openings. Alternatively, the tube is produced from a perforated screen, for example of the Johnson screen type.

In accordance with an alternative embodiment, the support means comprises a plurality of vertical arms fixed to the bottom of the basket and equipped with fastening means configured to cooperate with the riser.

Preferably, the bottom of the baskets is permeable to the liquid phase and the height h of the support means is less than the height H of the risers in a manner such as to generate a space for collecting the liquid phase between the bottom of the baskets and the plate. This embodiment is advantageous because it can be used to provide a zone for collecting liquid in which the purified liquid phase is mixed before being distributed over the catalytic bed via the risers. In this embodiment, the openings for the risers are essentially located in the liquid collection zone and the support means are not necessarily permeable to liquid.

In accordance with another preferred embodiment, the filtration baskets comprise at least one riser which is permeable to gas and the bottom of the basket is permeable to the liquid phase. Each basket is placed on at least one riser of the solid plate in a manner such that the bottom of the basket forms the support means for the basket cooperating with the riser of the solid plate.

In accordance with a preferred embodiment, the baskets are delimited by a riser of the plate located at each extremity of the sides of the basket.

Preferably, the baskets located at the periphery of said device have at least one lateral wall which is curved. This embodiment can be used to produce a device which can follow the curvature of the wall of the reactor in which it is installed in a manner such as to cover the section of the reactor in a compact manner.

Preferably, two adjacent baskets are separated by a free space or functional clearance in a manner such as to allow them to be put into position and removed basket by basket. As an example, this free space is in the range 1 to 20 mm, preferably in the range 1 to 10 mm.

The present invention also pertains to a reactor operating in descending gas and liquid co-current mode, comprising:
 a fixed catalytic bed;
 a device for filtration and distribution of a gaseous phase and a liquid phase in accordance with the invention disposed upstream of the catalytic bed;
 at least one layer of filtration means disposed in the baskets;
with the proviso that the upper end of a riser is located above the upper filtration layer when said riser passes through the bottom of the basket.

The reactor in accordance with the invention is, for example, a reactor operating in trickle flow mode with a descending co-current of gas and liquid with a liquid flow rate in the range 0.1 to 5 cm/s, for example in the range 0.1 to 1 cm/s (in the case of hydrotreatment reactors) or in the range 1.1 to 5 cm/s (in the case of selective hydrogenation reactors).

Preferably, the filtration and distribution device is disposed in the reactor in a manner such that an annular zone is left open between the walls of the adjoining peripheral baskets and the wall of the reactor. As an example, the annular zone corresponds to 2% to 50% and preferably to 5% to 20% of the section of the reactor.

In accordance with the invention, the baskets may contain a plurality of layers of filtration medium.

Advantageously, the filtration and distribution device disposed in the reactor comprises at least one perforated removable protective screen disposed above the upper layer of filtration medium. This protective screen can be used to protect the filtration medium from the inflow of the gas/liquid stream entering the reactor, thereby avoiding any projection of particles constituting the upper layer of filtration medium. In the context of the invention, the device may also comprise one removable screen per basket, thus allowing full baskets to be removed by orientating them at an angle with respect to the horizontal in order to facilitate passing them through an outlet orifice formed in the reactor (for example a man-hole).

Preferably and for ease of handling reasons, the removable baskets have a dimension which is smaller than that of a man-hole formed in the reactor.

The principal envisaged application is the catalytic treatment of heavy oil cuts, even though the present invention can be applied to any hydrogenation of oil cuts charged with crusting particles or precursor elements for the formation of coke, which could cause clogging of the fixed bed.

DETAILED DESCRIPTION OF THE INVENTION

Further characteristics and advantages of the invention will become apparent from the following description made by way of illustration alone and which is non-limiting in nature and made with reference to the accompanying drawings, in which:

BRIEF DESCRIPTION OF THE DRAWINGS

In general, similar elements are denoted by identical reference numerals in the figures.

The present invention concerns a filtration and distribution device intended to supply a catalytic reactor operating on a gas and liquid feed, more particularly in a flow mode known as a trickle flow mode, i.e. with a superficial liquid flow rate in the range 0.1 cm/s to 5 cm/s.

Figure 1:
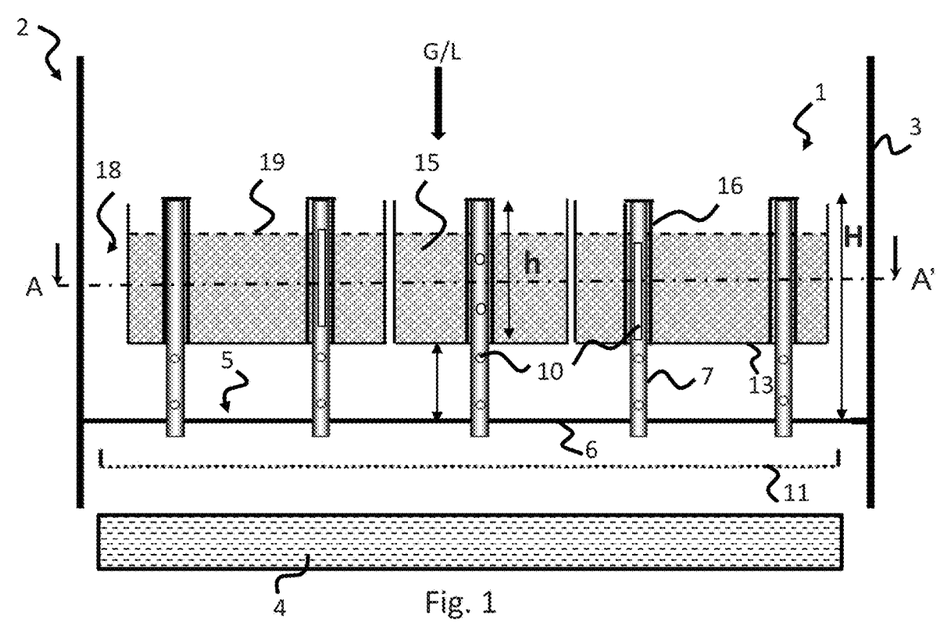
FIG. 1 is a diagrammatic sectional view of a reactor operating in descending gas and liquid co-current mode including a filtration and distribution device disposed upstream of a fixed catalytic bed.

Referring to FIG. 1, the device 1 for filtration and distribution of a gaseous phase and a liquid phase is disposed in a catalytic reactor 2 operating in a descending gas and liquid co-current mode, with a vessel which is delimited by a wall 3 which is generally circular in cross-section. The device 1 is disposed upstream of a fixed catalytic bed 4. The device in accordance with the invention may be defined as a distributor plate the function of which is to transform the two-phase jet entering the reactor into a gas/liquid mixture which is uniformly distributed over the surface of the catalytic bed placed downstream of said plate and which also integrates a filtration function by means of the use of a filtration layer.

Figure 2:
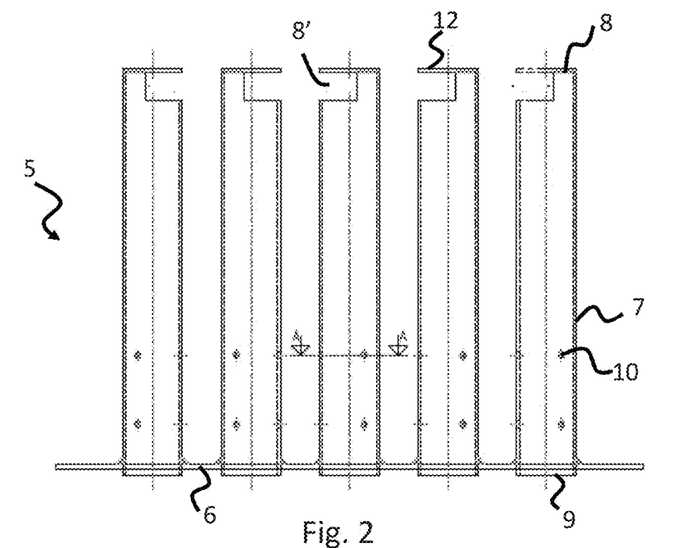
FIG. 2 is a detailed view of a profile of a distributor plate of a filtration and distribution device in accordance with the invention.

Referring to FIGS. 1 and 2, the device 1 comprises a distributor plate 5 which comprises a solid plate 6 (also known as a solid tray 6) on which means 7 for distribution of a two-phase gas/liquid mixture are fixed. The distribution means 7 which pass through the solid plate 6 are in the form of vertical risers 7 closed at their upper end 8 and open at their lower end 9 and perforated with lateral orifices 10 (also termed openings here) distributed over the height of the risers 7 which function as described below in detail. It should be noted that alternatively, the openings 10 formed in the risers 7 may be replaced by one or more slots. Each riser 7 further comprises a lateral opening 8' located at its closed upper end 8 in order to be able to introduce the gaseous phase. Preferably, the distributor plate 5 is configured in a manner such that the solid plate 6 has a section which corresponds to that of the reactor vessel. Thus, if the reactor is circular in section, the dimension of the section of the solid plate corresponds to that of the internal diameter of the reactor.

As indicated in FIGS. 1 and 2, the lower end 9 of the risers 7 opens at or below the solid plate 6 and above the fixed catalytic bed 4. Preferably, the reactor further comprises a dispersive element 11 disposed below the distributor plate 5 which functions to break up and disperse the jet of gas/liquid mixture which is expelled from the lower end 9 of the risers 7. It will be noted from FIG. 2 that the open upper end 8 of the risers 7 is capped by a deflector element 12 which prevents liquid phase from being introduced via the opening of the upper end 8 but allows the gaseous phase to pass through in the lateral zone of the upper portion.

In accordance with the invention, the device 1 further combines a filtration function provided by a plurality of filtration baskets disposed above the distributor plate 5 and which are supported thereby.

Figure 3:
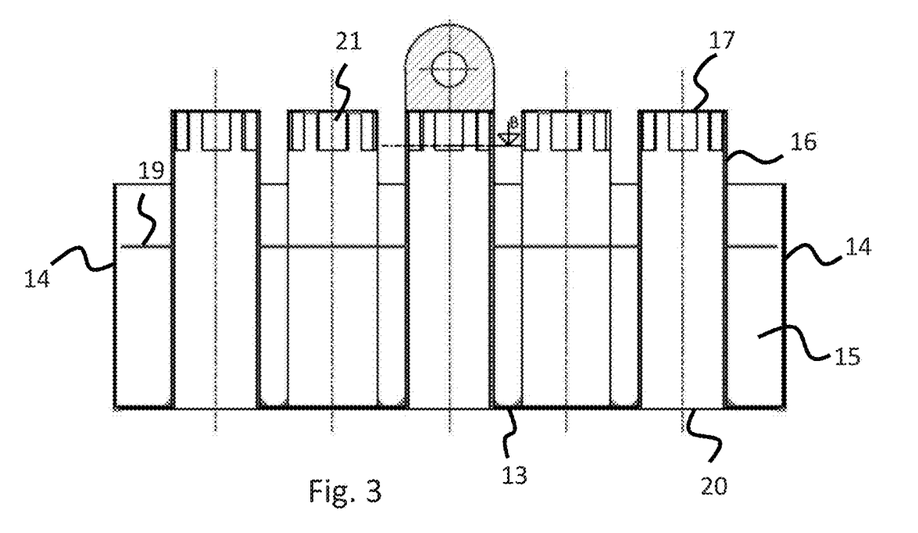
FIG. 3 is a detailed view of a profile of an assembly of baskets of a filtration and distribution device in accordance with the invention.

As can be seen in FIG. 3, the filtration baskets are composed of a bottom 13 which supports at least three substantially vertical lateral walls 14. The vertical walls 14 and the bottom 13 are porous in order to be permeable to the liquid phase while retaining the filtration medium 15. The vertical walls 14 and the bottom 13 may be formed by a metallic screen, for example of the Johnson screen type which is known to the person skilled in the art, or by a metal plate pierced with orifices wherein the mesh size of the screen or the orifices is such that it is strictly less than the mean dimension of the constituent elements of the filtration medium 15 carried by the basket.

In accordance with the invention and with reference to FIGS. 1 and 3, the basket further comprises at least one means 16 for supporting the basket cooperating with at least one riser 7 of the distributor plate 5. In the example of FIG. 3, the support means 16 is in the form of a tube fixed on the bottom of the basket which has a diameter that is substantially larger than that of the riser 7. The tube is closed at its upper end by a plate 17 and open at its lower end 20 in a manner such that the tube is capable of receiving the riser. Once the basket is in position, it rests on the riser 7 via the plate 17. It should also be noted that the section which adjoins the upper end of the tube 16 comprises openings 21 which are in communication with the open upper end of the riser on which it is mounted so as to allow the passage of gaseous streams into the tube 16 then into the riser 7 of the distributor plate. In a particular embodiment, when the risers are provided with orifices distributed over their height, the tubes are also porous over at least the lower half of their height and preferably over their entire height in order to allow the passage of the purified liquid phase from the filtration baskets into the distribution risers. In accordance with another alternative embodiment, not shown, the support means are in the form of vertical arms fixed to the bottom of the basket and said arms are equipped with fastening means configured to cooperate with the riser, for example at the upper opening of the riser or at any level over the height of the riser.

Figure 4:
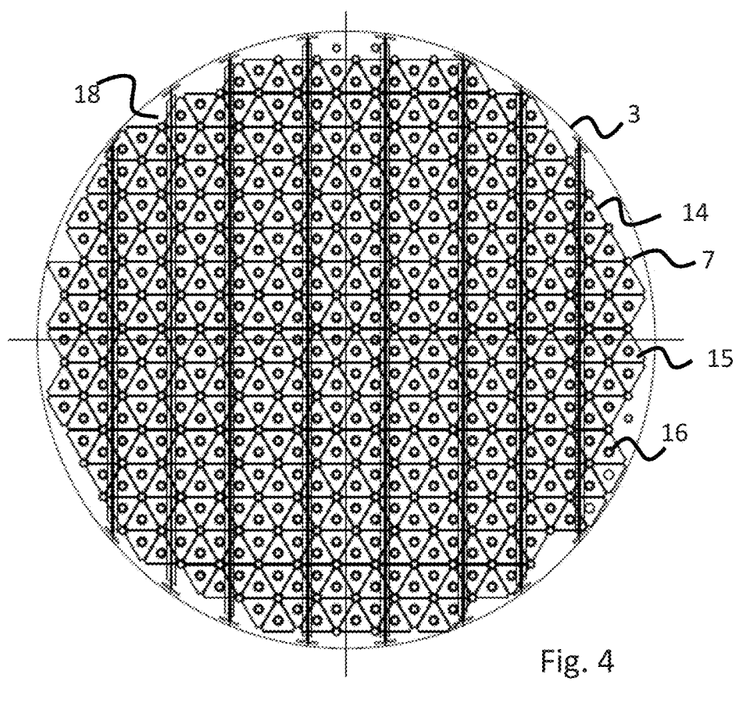
FIGS. 4 to 6 are views in a horizontal plane passing through the line (AA') of FIG. 1, of an assembly of filtration baskets of a filtration and distribution device in accordance with the invention.
Figure 5:
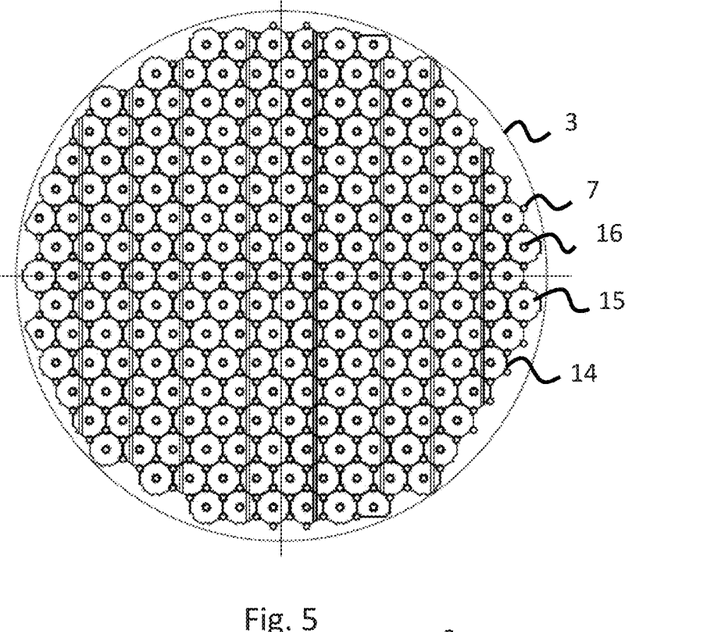
Figure 6:
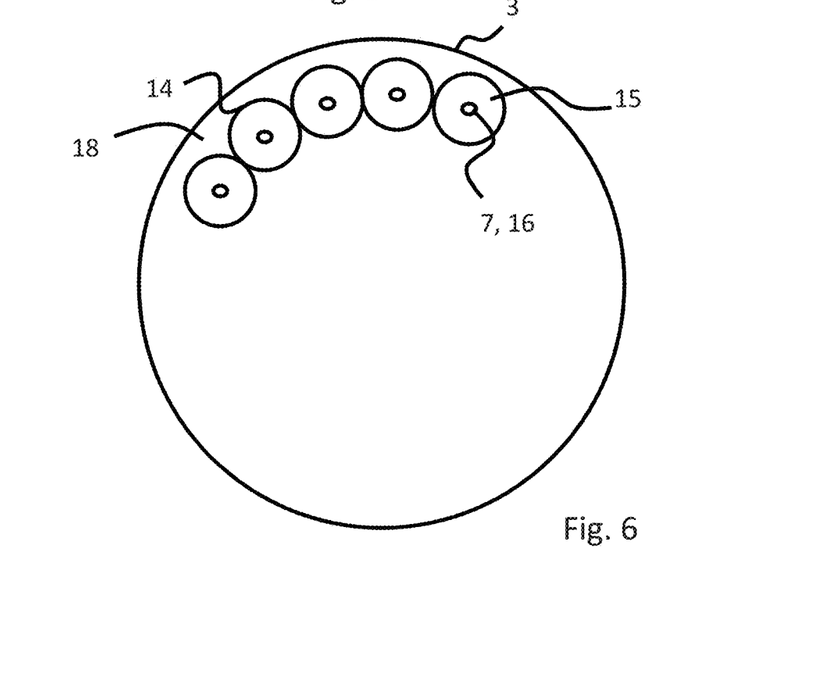

The horizontal section defined by the vertical walls 14 may be triangular (in the case of three vertical walls), as can be seen in FIG. 4, circular (the particular case of a vertical wall in the form of an ellipsoid) as can be seen in FIG. 6, or hexagonal (in the case of six vertical walls), as shown in FIG. 5. The horizontal section of a basket may also be a quadrilateral in shape, for example square or rectangular in shape.

FIG. 1 represents a particular embodiment of the filtration and distribution device in which the bottom 13 of the baskets is permeable to the liquid phase and in which the height h between the bottom of the basket and the upper end of the support means 16 is less than the height H of the risers in a manner such as to generate a collecting space E for the liquid phase (also termed the mixing zone for liquid E) between the bottom 13 of the baskets and the distributor plate 5. It should be noted that in this embodiment, the openings 10 of the risers are essentially located in the collecting space in a manner such as to communicate therewith and such that the walls of the tubes 16 supporting the basket are not necessarily permeable to liquid; as an example, the walls of the tubes might be solid.

It should be noted that, as can also be seen in FIG. 1, the openings 10 for the risers 7 may be present over the major portion of the height of the risers 7 in a manner such that said openings 10 are located in the layer of filtration medium 15. This means that when the support means is permeable to liquid, the distribution of the liquid can be maintained as clogging continues, since the set of risers 7 is always in use and the liquid flow rate remains approximately identical between the risers, the flow rate being essentially conditioned by the level of liquid established in the filtration baskets. The distribution of the liquid thus remains under control throughout the service life of the filtration bed and the progressive use of the lateral orifices or lateral slots distributed over the length of the risers means that the filtration bed can be used until it has been completely saturated, without the rise in the pressure gradient which would force the reactor to be shut down.

Preferably and as indicated in FIG. 1, the section developed by the set of filtration baskets of the device does not occupy the whole section of the reactor. In fact, there is an annular space 18 between the filtration zone of the baskets termed "peripheral" and the wall 3 of the reactor. This annular space 18 allows liquid to pass into the collection zone E and then towards the distribution means 7 even in the situation in which the filtration medium is crusted by the various impurities recovered over time.

In the case in which the filtration function is no longer provided by the filtration baskets, the distributor plate nevertheless continues to function via the openings 10 of the riser elements 7 which are located in the mixing zone for liquid E.

The width of this annular space is set in a manner such that the pressure balance is retained even in the case in which the plate is completely clogged. Preferably, the annular zone 18 corresponds to 2% to 50%, preferably to 5% to 20% of the section of the reactor.

When the filtration and distribution device is employed in a reactor, the filtration baskets are filled with one or more layers of filtration medium 15. As an example, the layer of filtration medium 15 may comprise elements termed protective elements, over a height which is generally in the range 100 mm to 450 mm, and preferably in the range 100 to 300 mm.

The protective elements constituting said layer may be:
particles of guard materials or any other particles which generally act as protective elements, for example those sold by Axens,
a catalyst support or a catalyst (fresh or spent or regenerated).

Any material which is capable of retaining clogging particles contained in the feed may be suitable in the device in accordance with the present invention, such as, for example, a reticulated material formed from ceramic or a metal, for example those sold by Unicat or Crystaphase. These reticulated materials may be present in the form of a wafer with a circular section 3 to 5 cm in diameter and with a height in the range 1 to 3 cm.

It should be noted that the filtration elements may take different forms such as, for example, beads, multi-lobed cylinders, simple cylinders, hollow tubes or indeed in the form of a wagon wheel; this list is not exhaustive.

In the majority of cases, a single layer of filtration medium is sufficient. However, for filtration medium heights of more than 200 mm, it is possible to use a plurality of layers and with the size of the filtration elements of a given layer which is less than that of the filtration elements constituting the immediately superior layer.

However, in order to use the device in a reactor, care is taken that when loading of the filtration medium 15 is complete, the upper end of the distribution risers 7 are located above the upper layer of filtration medium in a manner such that passage of the gaseous phase into the interior of the riser of the distributor plate is not compromised.

As indicated in FIG. 1, the device preferably comprises a perforated protective screen 19 disposed above the upper layer of filtration medium 15. This protective screen can be used to protect the filtration medium from the inflow of the gas/liquid stream entering the reactor in order to prevent any projection of particles constituting the upper layer of filtration medium and also to allow for easier loading/discharging by inclining it with respect to the horizontal.

In accordance with another embodiment of the filtration and distribution device, the height h of the support means is substantially equal to the height H of the risers in a manner such that no collecting space E for the liquid phase is generated between the bottom of the baskets and the plate and such that the baskets rest on the solid plate 6. In this embodiment, the support means 16 for the basket are permeable to liquid over at least the lower half of their height and preferably over the major part of their height, and the lateral orifices 10 of the risers are distributed over at least the lower half of the height of the riser and preferably over the major portion of the height of said risers 7. Given that in this embodiment the bottom 13 of the baskets rests on the solid plate 6, the bottom 13 does not need to be permeable to liquid.

The function of the filtration and distribution device installed in a reactor in descending co-current gaseous phase and liquid phase flow mode is described below with reference to FIG. 1. In general, the filtration plate in accordance with the invention is at least positioned upstream of the first catalytic bed 4 (in the direction of flow of fluids). When the two-phase gas/liquid feed is introduced in a staggered manner onto the various catalytic beds spaced along the length of the reactor, it is possible to position a device in accordance with the invention upstream of each of the catalytic beds.

The gas/liquid mixture is sent to the head of the device in accordance with the invention as indicated by the arrow G/L. The gaseous fraction of the mixture which penetrates into the risers 7 via the upper openings after passing through the upper openings 21 of the support means 16 is directed below the solid plate 6. Regarding the liquid fraction which is prevented from passing into the upper portion of the risers by the deflector elements 12 (see FIG. 2), this is collected in the filtration baskets and percolates through the layer or layers of filtration medium contained in the baskets. Contact of the liquid phase with the filtration elements means that the particles responsible for clogging the catalytic bed in order to supply a liquid which is termed "purified" which diffuses through the orifices at the bottom of the baskets.

The purified liquid is then collected in the collecting space E which is only occupied by liquid, since when the reactor is functioning normally, the level of liquid above the plate 6 is inside the layer of medium 15 and below the upper end of the risers 7 which are only accessible to gas. The purified liquid accumulates in the collecting space E then diffuses into the risers via the openings 10 opening into this space and is mixed with the gaseous phase which circulates in the risers 7. The purified gas/liquid mixture is evacuated from the risers 7 via their lower opening 9 below the solid plate 6. The jet of gas/liquid mixture is then dispersed when it encounters the dispersive element or elements 11 disposed between the catalytic bed 4 and the solid plate 6.

In a particular embodiment, the risers also comprise orifices which are located in a zone corresponding to the height of the filtration medium and the support means 16 (tube) are porous to the liquid phase in a manner such that the purified liquid is capable of diffusing directly from the filtration zone into the risers, passing through the tubes.

The function of a filtration and distribution device in accordance with the invention in which the bottom 13 of the baskets, which may be solid, rest on the plate 6 is similar to that described above, with the exception that the purified liquid is not evacuated from the baskets via their bottom but diffuses through the support means 16 then into the risers 7 via the lateral orifices 10 thereof. FIGS. 4 to 6, which are sectional views in a horizontal plane passing through the line (AA') of FIG. 1, show various shapes which the filtration baskets which are supported by the risers 7 of the distributor plate can take.

It will be observed that the filtration baskets in accordance with the invention comprise at least three vertical lateral walls 14 which delimit the section of the basket. The baskets which have a wall adjacent to the wall of the reactor may include, over part of their wall, a curvature which follows that of the wall of the reactor. The horizontal section delimited by the vertical walls may be triangular (in the case of three vertical walls), as can be seen in FIG. 4, or hexagonal (in the case of six vertical walls), as can be seen in FIG. 5. In these preferred embodiments, at least one riser passes through each basket and the support means of the basket cooperates with that riser.

As indicated in FIGS. 4 and 5, the baskets have angles which are limited by a riser of the distributor plate. Thus, in the case of FIG. 4, the basket with a triangular shape has a central riser passing through it, with a riser at each angle. In FIG. 5, the basket is hexagonal in shape and has a central riser and six risers passing through it, one at each of the angles of the hexagon.

Alternatively and as can be seen in FIG. 6, the baskets are delimited by a vertical wall which is circular in shape, which is a particular case of an ellipse.

In the case in which the baskets employed do not have a vertical wall in the shape of an ellipse, baskets which have none if their walls in contact with the wall of the reactor and which are termed central baskets are distinguished from baskets which have a portion of their walls adjoining the wall of the reactor and which are termed peripheral baskets. The peripheral baskets may have at least one curved lateral wall following the shape of the wall 3 of the reactor, while the central baskets have straight vertical walls.

In another alternative embodiment which is not shown, the baskets involved have angles which are limited by a riser and wherein the bottom is not traversed by a riser of the distributor plate. In this case, the support means for the basket are carried by the lateral walls of the baskets and may take the form of curved fins forming a hook which can be fastened onto the riser.

In general, the set of baskets is adapted so as to cover the entire section of the reactor, leaving only a free space or functional clearance between the lateral walls of adjacent baskets so as to allow them to be moved individually upon introduction or removal, i.e. basket by basket.

Figure 7:
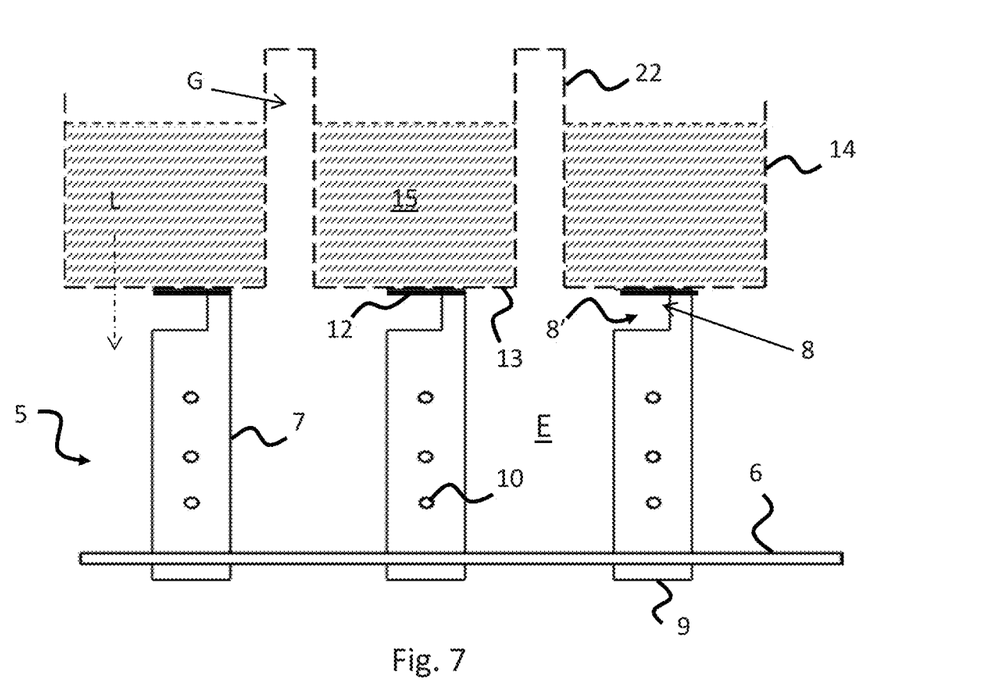
FIG. 7 is a profile view of a filtration and distribution device in accordance with another embodiment.

Another embodiment of a filtration and distribution device in accordance with the invention is shown in FIG. 7. The filtration and distribution device 1 comprises a distributor plate 5 the design of which is identical to that of FIG. 2, and a plurality of filtration baskets containing at least one filtration medium 15.

The distributor plate 5 is equipped with a plurality of vertical risers 7 closed at their upper end 8 and open at their lower end 9 and perforated with lateral orifices 10 (also termed openings here) distributed over the height of the risers 7. It should be noted that the wall of the riser 7 located at the upper end 8 is notched so as to form an opening 8' allowing gas to pass through. The riser 7 comprises a plate 12 which can be used to close the upper end 8.

As can be seen in FIG. 7, the filtration baskets are formed by a bottom 13 which is permeable to liquid and by vertical walls 14 which are preferably also permeable to liquid and furthermore comprise at least one riser 22 intended to allow the passage of gas towards the distributor plate 5. As an example, the baskets (bottom, lateral walls and riser) may be constituted by a screen or by metal sheets having perforations for the passage of gas and liquid.

The embodiment of FIG. 7 is distinguished from that of FIG. 1 essentially in that each filtration basket is supported by at least one riser 7 of the distributor plate via its bottom 13 which thus constitutes a support means 16 which cooperates with the riser of the distributor plate. More precisely, in the case of FIG. 7, the bottom 13 rests on the plate 12 of the riser 7.

Still referring to this embodiment, the riser 22 of the basket is offset (FIG. 7) or in alignment with respect to a riser 7 of the distributor plate. When the basket is disposed in a manner such that its riser 22 is aligned with a riser 7 of the distributor plate, the plate 12 of said riser comprises openings allowing gaseous fluid to pass between the two risers.

Compared with the embodiment shown in FIG. 1, the assembly/dismantling of the basket is easier because positional accuracy as regards the baskets with respect to the distributor plate is no longer required because the basket no longer has to slide along the risers 7. This embodiment also has an advantage over the embodiment shown in FIG. 1 of allowing the height of the filtration medium to be increased independently of the height of the riser 7 of the distributor plate. In accordance with a preferred embodiment, the bottom of the basket 13 and the plate 12 of the riser 7 respectively comprise complementary positioning elements (of the male/female type) which are capable of engaging with each other to thereby hold the basket in place with respect to the distributor plate.

The function of a filtration and distribution device of this type is in practice similar to that described with reference to FIG. 1, but is characterized in that the gaseous fraction of the gas/liquid mixture diffuses towards the collecting space E delimited by the solid plate 6 and the bottom 13 of the basket, in a manner such as to form a gaseous overhead in said space E. The liquid fraction percolates through the filtration medium 15 then passes through the bottom 13 of the basket in order to accumulate in the collecting space E below the gaseous overhead. The purified liquid accumulated in the collecting space E then diffuses into the risers 7 via the openings 10 which open into this space and is mixed with the gaseous fraction which circulates in the risers 7 via the opening 8'.

The filtration and distribution device in accordance with the present invention can be applied to hydrotreatment processes, selective hydrogenation processes, residue conversion processes or processes for the oxidation of oil cuts. The heavy feeds which are capable of being treated using the present filtration distributor plate may be defined as being those with a boiling point of more than 350° C., in particular of the vacuum distillate, residue or the like: vacuum gas oil, atmospheric residues, vacuum residues, deasphalted oils, or vacuum distillates or residues obtained from conversion processes such as, for example, coking, or fixed bed, ebullated bed or moving bed hydrotreatment or hydrocracking processes. All of these types of residues or vacuum distillates may be used alone or as a mixture.

These heavy feeds may be used as they are or diluted with a hydrocarbon fraction or a mixture of hydrocarbon fractions.

The heavy feeds concerned by the present invention may also comprise cuts obtained from coal liquefaction processes, aromatic extracts, or any other hydrocarbon cuts.

EXAMPLE

An illustrative example of the dimensions of a filtration and distribution device in accordance with the invention with reference to FIG. 5 for a reactor with a 5.5 m internal diameter is described below.

The characteristics of the distributor plate which supports 1149 vertical risers are as follows:
 diameter of solid plate: 5.5 m
 The dimensions of the vertical risers are:
 height of risers: 440 mm from the solid plate
 external diameter of risers: 50 mm
 pitch between risers: 150 mm
 The risers comprise two rows of orifices for the admission of liquid:
 row 1 of orifices: height with respect to solid plate 40 mm, 3 holes of 5 mm
 row 2 of orifices: height with respect to solid plate 130 mm, 3 holes of 5 mm
 opening for the passage of gas at riser head for the admission of gas: 50 mm.

The device also comprises 383 baskets with a hexagonal section which can receive one riser at each angle of the hexagon. The dimensions of the basket are:
 side of hexagon: 95 mm
 height of vertical walls: 240 mm The hexagonal bottom of each basket is provided with a central orifice surmounted by a tube closed at its upper end and into which a distribution riser is introduced. The dimensions of the tube are:
 internal diameter of tube: 55 mm
 height of tube: 300 mm The baskets are thus supported by the central tube which rests on the riser. The bottoms of the baskets are located at a distance of 140 mm above the solid plate of the distributor plate in a manner such as to define a mixing space for the purified liquid phase which has a height of 140 mm.

The baskets could thus contain a filtration medium, composed of one or more layers, with a thickness of 230 mm measured from the bottom of the basket.

The invention claimed is:

1. A device (1) for filtration and distribution of a gaseous phase and a liquid phase, which can be disposed upstream of a fixed catalytic bed (4) of a reactor (2) operating with a descending co-current of gas and liquid, comprising:
 a solid plate (6) extending in a horizontal plane on which substantially vertical risers (7) which are open at their upper and lower ends are fixed, said risers (7) being provided with openings (10) over at least a fraction of their height;
 a plurality of removable baskets which are capable of containing and retaining at least one filtration medium, each removable basket being defined by an ellipsoidal vertical wall (14) or by at least three vertical lateral walls (14) and a bottom (13), the vertical walls and/or the bottom being permeable to gas and to liquid and wherein each basket is provided with at least one basket support means (16) cooperating with a riser of the plate in order to support the removable basket, and wherein the support means (16) comprise a plurality of vertical arms fixed to the bottom of the basket and said arms are equipped with fastening means configured to cooperate with a riser (7).

2. The device according to claim 1, wherein at least one riser (7) passes through the bottom (13) of the basket and the support means (16) cooperate with the riser passing through the bottom (13).

3. The device according to claim 1, in wherein at least one of the lateral walls (14) comprises the support means cooperating with a riser (7).

4. The device according to claim 1, wherein the support means (16) comprise a tube fixed on the bottom of the basket the diameter of which is substantially greater than that of the riser, said tube being closed at an upper end (17) and open at a lower end (20) in a manner such that the tube is capable of receiving the riser (7).

5. The device according to claim 1, wherein the bottom (13) of the baskets is permeable to the liquid phase and the height h of the support means is less than the height H of the risers in a manner such as to generate a space (E) for collecting liquid phase between the bottom of the baskets and the solid plate (6).

6. The device according to claim 1, wherein the baskets are delimited by a riser of the plate located at each extremity of the sides of the basket.

7. The device according to claim 1, wherein the baskets located at the periphery of said device have at least one lateral wall (14) which is curved.

8. The device according to claim 1, n wherein the baskets comprise at least one riser (20) which is permeable to gas and the bottom of the basket is permeable to the liquid phase and wherein each basket is placed on at least one riser (7) of the solid plate (6) in a manner such that the bottom (13) of the basket forms the support means (16) for the basket cooperating with the riser (7) of the solid plate.

9. The device according to claim 1, wherein two adjacent baskets are separated by a free space in a manner such as to allow them to be put into position and removed basket by basket.

10. A device (1) for filtration and distribution of a gaseous phase and a liquid phase, which can be disposed upstream of a fixed catalytic bed (4) of a reactor (2) operating with a descending co-current of gas and liquid, comprising:
 a solid plate (6) extending in a horizontal plane on which substantially vertical risers (7) which are open at their upper and lower ends are fixed, said risers (7) being provided with openings (10) over at least a fraction of their height;

a plurality of removable baskets which are capable of containing and retaining at least one filtration medium, each removable basket being defined by an ellipsoidal vertical wall (14) or by at least three vertical lateral walls (14) and a bottom (13), the vertical walls and/or the bottom being permeable to gas and to liquid and wherein each basket is provided with at least one basket support means (16) cooperating with a riser of the plate in order to support the removable basket, and wherein the tube (16) is permeable to the liquid phase.

11. The device according to claim 10, wherein at least one riser (7) passes through the bottom (13) of the basket and the support means (16) cooperate with the riser passing through the bottom (13).

12. The device according to claim 10, wherein at least one of the lateral walls (14) comprises the support means cooperating with a riser (7).

13. The device according to claim 10, wherein the support means (16) comprise a tube fixed on the bottom of the basket the diameter of which is substantially greater than that of the riser, said tube being closed at an upper end (17) and open at a lower end (20) in a manner such that the tube is capable of receiving the riser (7).

14. The device according to claim 10, wherein the bottom (13) of the baskets is permeable to the liquid phase and the height h of the support means is less than the height H of the risers in a manner such as to generate a space (E) for collecting liquid phase between the bottom of the baskets and the solid plate (6).

15. The device according to claim 10, wherein the baskets are delimited by a riser of the plate located at each extremity of the sides of the basket.

16. The device according to claim 10, wherein the baskets located at the periphery of said device have at least one lateral wall (14) which is curved.

17. The device according to claim 10, wherein the baskets comprise at least one riser (20) which is permeable to gas and the bottom of the basket is permeable to the liquid phase and wherein each basket is placed on at least one riser (7) of the solid plate (6) in a manner such that the bottom (13) of the basket forms the support means (16) for the basket cooperating with the riser (7) of the solid plate.

18. The device according to claim 10, wherein two adjacent baskets are separated by a free space in a manner such as to allow them to be put into position and removed basket by basket.

* * * * *